United States Patent Office 3,211,785
Patented Oct. 12, 1965

3,211,785
OXIDATION OF AMINES
Martin J. Kilroy, Caldwell Township, and Paul N. Rylander, Newark, N.J., assignors, by mesne assignments, to Engelhard Industries, Inc., Newark, N.J., a corporation of Delaware
No Drawing. Filed May 1, 1959, Ser. No. 810,263
4 Claims. (Cl. 260—540)

This invention relates to the oxidation of alcohols and amines and, more particularly, relates to the oxidation of primary and secondary alcohols and amines in the liquid phase, in the presence of a ruthenium-containing catalyst.

Platinum and palladium have been used successfully in oxidation processes in the liquid phase, but ruthenium has not been heretofore so used. Liquid phase catalytic oxidations inherently have a number of advantages; reaction can be conveniently performed at room temperature, i.e., 25° C., and the process is, therefore, suitable for the treatment of heat-sensitive substrates. Some catalytic oxidations show remarkable selectivity of a nature not possible to achieve through ordinary oxidation procedures.

There is a great need in the art for an efficient catalyst for the oxidation of cyclic alcohols, such as cyclohexanol, to cyclohexanone. There is also a great industrial demand for adipic acid, which is an intermediate in the manufacture of nylon, and although cyclohexanol and cyclohexanone can both be used as intermediates in the synthesis of adipic acid, it is advantageous to use cyclohexanone. Since both cyclohexanol and cyclohexanone can be used as intermediates in the formation of adipic acid, it is not essential to have a quantitative or near-quantitative conversion in the dehydrogenation step, but it is important that no large quantity of phenol, cyclohexane (by dehydration) or benzene (by dehydration and dehydrogenation) be formed.

In accordance with the present invention, primary alcohols may be oxidized to aldehydes or to acids, and secondary alcohols may be oxidized to ketones. Amines may be oxidized to a variety of products, depending upon the conditions employed. Thus, n-butylamine, for example, yields nitrobutane, nitrosobutane, butyraldehyde and butyric acid.

Among the primary alcohols which may be treated in accordance with the present invention are n-butyl alcohol, isobutyl alcohol, benzyl alcohol, 2-phenyl ethanol, methyl alcohol, cyclohexyl carbinol, and tetrahydrofurfuryl alcohol. Among the secondary alcohols which may be oxidized in accordance with the invention are isopropyl alcohol, sec-butyl alcohol, cyclohexanol, cyclopentanol, 1-phenyl ethanol, and diphenyl carbinol. Among the amines which may be oxidized in accordance with the invention are n-butylamine, isobutyl amine, sec-butyl amine, benzylamine, 1-phenyl ethylamine, 2-phenyl ethylamine. Aldehydes may also be oxidized in accordance with the process of the present invention, and among such aldehydes are formaldehyde, acetaldehyde, propionaldehyde, benzaldehyde, furfural, heptaldehyde and phenyl acetaldehyde.

Generally speaking, the alcohol or amine to be oxidized is contacted in the liquid phase with a ruthenium-containing catatlyst in the presence of an oxygen-containing gas such as oxygen or air, at a temperature in the range of about 0 to 250° C. The operating pressure may be in the range of about 0.2 atmosphere to 100 atmospheres partial pressure of oxygen. Generally, if the oxygen supply is sufficient, the reaction time decreases in an inverse relation to the amount of catalyst employed.

The catalyst employed in the process of the invention is a ruthenium-containing catalyst and may be, for example, elemental ruthenium, or oxides thereof, such as the dioxide and tetroxide, or salts of ruthenium, such as barium ruthenite; ruthenates such as magnesium, strontium, calcium, silver, barium, potassium and sodium ruthenates; perruthenates such as sodium and potassium perruthenates and the like; ruthenium halides, such as ruthenium trichloride, ruthenium tetrachloride hydrate, ruthenium pentafluoride and the like; ruthenium sulfides such as ruthenium disulphide; and chloro salts of ruthenium; such as potassium chloro perruthenate.

The elemental ruthenium, or compound thereof, is supported on a suitable catalyst carrier such as carbon, activated alumina, silica gel, asbestos, magnesium carbonate, calcium carbonate, barium sulfate, kieselguhr, zirconium oxide, titanium dioxide and other similar catalyst supports. Of these, carbon is preferred. The supported ruthenium-containing catalyst can be used with solvents such as water, acetone, acetic acid, ethyl acetate, benzene, or in the absence of a solvent.

The process may be conducted in a batchwise or continuous manner, and may be continuous when a catalyst of suitable form is employed. In such a case, the substrate with, or in the absence of, a solvent is passed through a packed column, while an oxygen-containing gas is passed through the column is concurrent or countercurrent flow. The ratio of catalyst to substrate in a batch reaction generally will be in the range of 0.001 to 1.0. The reaction time, generally, is in the range of 10 to 20 hours.

The catalyst may be prepared in accordance with known methods for preparing such catalysts. For example, the catalyst support may be first coated or impregnated with a solution of a ruthenium metal salt, after which the impregnated material is dried and heated to the decomposition temperature while being contacted with a moving stream of reducing gas.

The invention will be further illustrated by reference to the following specific examples, in which the catalyst functioning rate (CFR) is defined as the moles of oxygen consumed per hour per gram of metal:

EXAMPLE I

A series of runs was made for purposes of evaluating the conversion of three catalysts: platinum on carbon, palladium on carbon and ruthenium supported on carbon. Each catalyst, 0.5 gram of 5 percent metal on carbon, and 10 ml. of substrate as indicated in the table below, were placed in a 250 ml. round-bottomed flask, provided with a magnetic stirrer and connected to a 1000 ml. measuring burette. The system was cooled when necessary to prevent loss of substrate and was then evacuated and filled with oxygen, after which the stirrer was started. The temperature was maintained at 25° C., and the oxygen absorption was measured as a function of time. The reaction time for the three runs given in the table below was 20 hours. The superiority of ruthenium catalyst supported on carbon is shown by the data of Table I for the oxidation of cyclohexanol:

Table I

| Catalyst | Substrate | CFR |
| --- | --- | --- |
| 0.5 g. 5 percent Pt/C | 10 ml. cyclohexanol | 0.009 |
| 0.5 g. 5 percent Pd/C | do | 0.0009 |
| 0.5 g. 5 percent Ru/C | do | 0.01 |

EXAMPLE II

Following the general procedure of Example I above, 0.5 gram of 5 percent ruthenium on carbon was added, together with one ml. of benzyl alcohol in 10 ml. of water, to the round-bottomed flask. The flask was filled with air and the stirrer was started. The benzyl alcohol was oxidized to benzaldehyde at a catalyst functioning rate of 0.0016 mole of oxygen consumed per hour per gram of metal. The yield of benzaldehyde, in the presence or absence of a solvent, is high, provided all of the benzyl alcohol is not oxidized; apparently, unchanged benzyl alcohol acts as an inhibitor for the much more rapid oxidation of benzaldehyde to benzoic acid.

EXAMPLE III

Following the general procedure of Example I above, 5.8 grams of hexamethylene diamine, 10 ml. of water and 0.5 gram of 5 percent ruthenium on carbon catalyst, were added to the round-bottomed flask, and the flask was filled with oxygen. A catalyst functioning rate of 0.004 was observed. The product was shown to contain the aldehyde group.

EXAMPLE IV

In water solution, aldehydes are formed by the oxidation of primary amines to imines and subsequent hydrolysis. The aldehydes can be oxidized further to acids.

Following the general procedure of Example I above, 0.92 ml. of n-butylamine in 10 ml. of water was oxidized in the apparatus of Example I, in the presence of air, at a temperature of 25° C., using 0.5 gram of 5 percent ruthenium on carbon as a catalyst. A CFR of 0.0024 was observed. The product was butyraldehyde and butyric acid with traces of nitro groups present.

EXAMPLE V

The round-bottomed flask of Example I was charged with 10 ml. of n-butyl alcohol and 0.5 gram of 5 percent ruthenium on carbon. The alcohol was oxidized in the presence of air at a temperature of 25° C., to provide a CFR of 0.0055. The product was butyraldehyde and butyric acid.

It will be obvious to those skilled in the art that many modifications may be made within the scope of the present invention without departing from the spirit thereof, and the invention includes all such modifications.

What is claimed is:

1. A process for the oxidation of a compound selected from the group consisting of primary and secondary lower alkyl and ar-lower alkyl amines, which comprises contacting the compound in liquid phase with a supported catalyst consisting essentially of ruthenium metal supported on a solid catalyst carrier in the presence of elemental oxygen at a temperature in the range of about 0° C.–250° C. and a pressure in the range of about 0.2 atmosphere to 100 atmospheres partial pressure of oxygen.

2. A process according to claim 1 in which a primary lower alkyl amine is oxidized in aqueous solution.

3. A process according to claim 1 in which the elemental oxygen is oxygen per se.

4. A process according to claim 1 in which the elemental oxygen is contained in air.

References Cited by the Examiner

UNITED STATES PATENTS

| | | | |
|---|---|---|---|
| 2,353,159 | 7/44 | Hull | 260—531 |
| 2,462,413 | 2/49 | Meath | 260—603 |

OTHER REFERENCES

Borisov et al., Chemical Abstracts, volume 32, page 2414 (1938).

Degering, "An Outline of Organic Nitrogen Compounds," pages 215–216 (1950).

LORRAINE A. WEINBERGER, Primary Examiner.

LEON ZITVER, CHARLES B. PARKER, Examiners.